Figure 1:
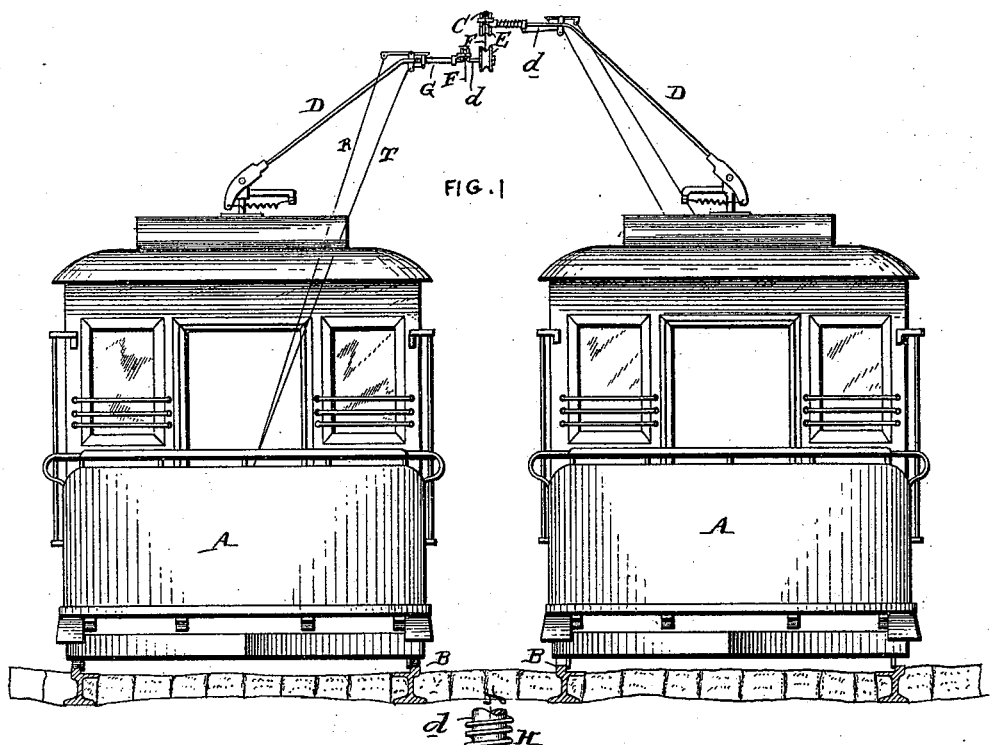

(No Model.) 2 Sheets—Sheet 1.

G. R. MITCHELL.
ELECTRIC TROLLEY.

No. 557,008. Patented Mar. 24, 1896.

Witnesses: Inventor.
H. L. Motherwell, Geo. R. Mitchell
C. M. Dietrich by Geo. H. Holgate
Attorney.

(No Model.) 2 Sheets—Sheet 2.

G. R. MITCHELL.
ELECTRIC TROLLEY.

No. 557,008. Patented Mar. 24, 1896.

Witnesses:
H. L. Motherwell
C. M. Dietrich

Inventor.
Geo. R. Mitchell
by Geo. H. Holgate
Attorney.

UNITED STATES PATENT OFFICE.

GEORGE R. MITCHELL, OF NEWTOWN, PENNSYLVANIA.

ELECTRIC TROLLEY.

SPECIFICATION forming part of Letters Patent No. 557,008, dated March 24, 1896.

Application filed November 22, 1895. Serial No. 569,753. (No model.)

*To all whom it may concern:*

Be it known that I, GEORGE R. MITCHELL, a citizen of the United States, residing at Newtown, in the county of Bucks and State of Pennsylvania, have invented certain new and useful Improvements in Electric Trolleys, of which the following is a specification.

My invention has reference to electric trolleys; and it consists of certain improvements which are fully set forth in the following specification and shown in the accompanying drawings, which form a part thereof.

It is customary in practice in the case of parallel tracks on an electric railway to provide independent suspended conductors for each track, so that the trolley or current-collecting device of the cars on the respective tracks make electrical contact with the under side of the particular suspended conductor corresponding to that track.

My improvement embodies certain features in the construction of a trolley or current-collecting device which shall be adapted to those cases where a single suspended conductor is arranged above and in common to two parallel tracks and in which cases the trolley of a car upon one track is required to pass the trolley of a car on the other track—that is to say, leave the suspended conductor—and after passing about the trolley of the second car to again travel upon the suspended conductor, the cars of the two tracks moving in opposite directions.

My invention comprehends certain specific improvements in trolley structure adapted to this system of electric railroad or means for supplying electric current to vehicles in motion, whether it be for motive power or for electric lighting, whereby the trolley when upon the curve in the suspended conductor corresponding to the curve of the track below shall properly present a guide, so that a trolley moving upon the suspended conductor in the opposite direction is positively insured a safe passage from the suspended conductor around the first-mentioned trolley and again to the suspended conductor.

In carrying out my improvements I employ a trolley-arm adapted to extend upward upon the vehicle and preferably arranged obliquely and laterally and formed with a horizontal projecting part at the top, combined with a current-collecting device, preferably a grooved wheel, adapted to make an under-running contact with the suspended conductor, and a flexible guide-frame extending to the front and to the rear and also below the current-collecting device or wheel, and furnished with suitable guides, such as grooved wheels, adapted to follow the alignment of the suspended conductor to cause the flexible guide-frame to be bent into a curve to correspond to a curve of the suspended conductor when necessary, whereby the current-collecting device of the oppositely-moving trolley may leave the suspended conductor, travel upon the flexible guide until it passes the current-collecting device corresponding to the guide, and again pass upon the suspended conductor as the vehicles pass each other.

My invention further comprehends such devices as above specified, combined with suitable means carried upon the free end of the trolley-arm for moving the guide-frame into or out of alignment with the current-collecting device and suspended conductor, so that the trolleys of the cars that pass in one direction only may have their flexible guide-frames in alignment with the suspended conductor.

I do not confine myself to any special construction of the various parts, as the essential feature of my improvement consists in the flexible guide-frame carried upon the trolley-arm at its free end for the purpose of corresponding to the curvature of the curves of the suspended conductor when reached, acting as a positive guide to guide a current-collector of another oppositely-moving trolley as it passes the trolley provided with the guide-frame, and preferably at the same time acting to provide a continuous supply of electricity to the current-collecting devices of both vehicles—that is to say, the current-collecting devices of one vehicle, while receiving itself current from the suspended conductor directly, delivers the current through its guide-frame to the second current-collecting devices corresponding to the second car.

Figure 2:
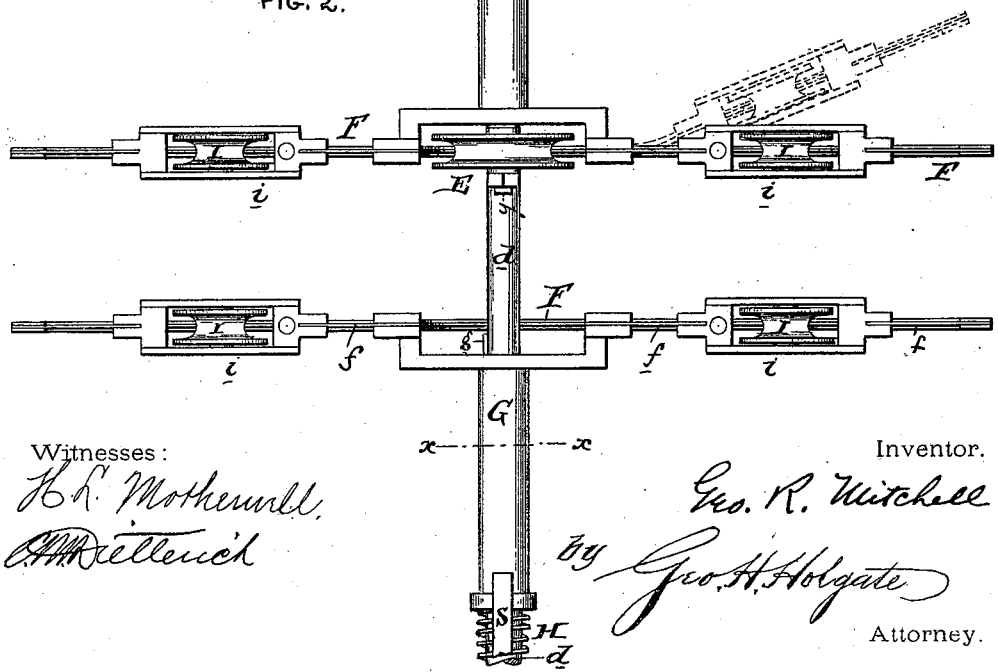
Figure 3:
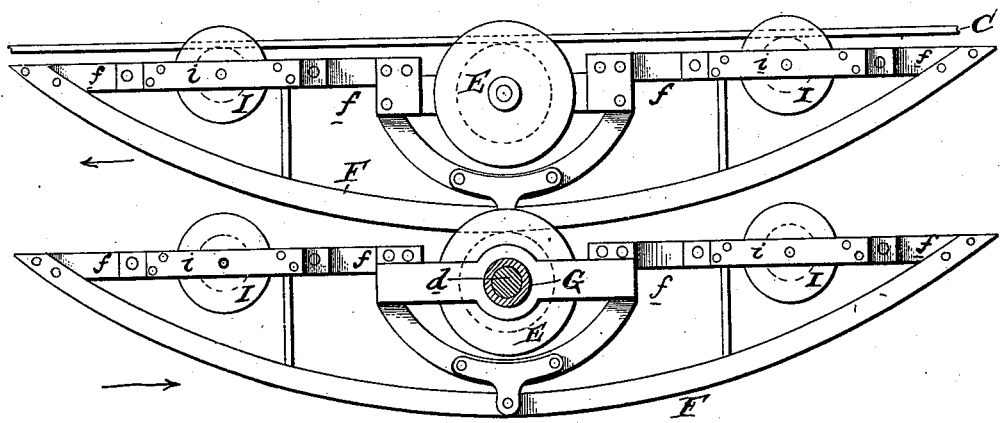
Figure 4:
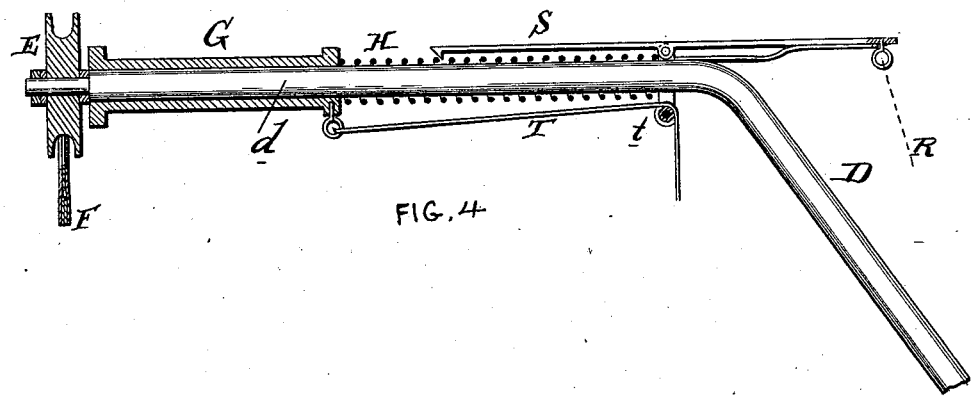

In the drawings, Figure 1 is a cross-section of an electric trolley with my improvement applied thereto. Fig. 2 is a plan view of the trolleys of two passing vehicles shown in Fig. 1, but with only the extreme ends of the trolleys illustrated. Fig. 3 is a sectional elevation of Fig. 2 on line $xx$, and Fig. 4 is a sectional elevation on the line $yy$ of Fig. 2.

A A are two electric cars traveling upon two parallel tracks B B and ordinarily moving in opposite directions.

C is the suspended conductor arranged midway between the two tracks and at a different elevation thereto, preferably at a considerable distance above the roof of the cars. Each of the cars is provided with an upwardly and laterally extending trolley D, connected to the car in any of the usual manners, so that it is spring-supported and has its free end located in such position as to bring the current-collecting wheel under the suspended conductor. In electric railways of this class the trolley projects to one side of the car and the arm extends laterally and obliquely upward. The other end of the trolley-arm D is preferably arranged horizontal, as at $d$, and to the extreme end of this is loosely journaled a grooved collector, such as a wheel E, which makes a traveling under contact with the suspended conductor for the purpose of collecting current to be delivered to the car either for motive power, lighting, or both.

G is a sleeve or movable support carried upon the free end of the arm D and held against rotation by means of a feather $g$ or other suitable device. Secured to this supporting-frame G is a flexible guide-frame F. (More clearly shown in Fig. 3.) This guide-frame may be made in any suitable manner so that it shall have lateral flexibility. As shown, it consists of a lower downwardly-curved portion F connected to a horizontal portion formed by the spring parts $f$ and bearings $i$ for grooved guide-wheels I, which latter run along adjacent to the suspended conductor C without necessarily pressing thereon. If the suspended conductor C is curved, as would be the case in passing about a curved track, the conductor pressing upon the flanges of the wheels I, causing the flexible guide-frame to be bent into a curve corresponding to the curve of the suspended conductor.

The frame G is pressed toward the collector-wheel E by means of a spring H surrounding the horizonal part of the arm $d$.

T is a cord or cable passing about a guide $t$ on the free end of the arm D and connected to the frame G, so that an operator upon the car may draw the supporting-frame G and the flexible guide-frame F backward against the action of the spring H into the position shown in the lower part of Fig. 2, where it is held by the spring-lock S. The object of making the guide-frame movable is to remove the action of the guide-frame of those trolleys corresponding to the cars moving in one direction. If the trolleys of the cars moving in one direction of the railway are provided with guide-frames immediately in line with the current-collecting device E, the trolley-wheels or guides of the trolleys of the cars moving in the opposite direction will upon meeting the first-mentioned trolleys pass from the conductor C upon the guide-frame E and thereby be conveyed about the first-mentioned trolley and again to the suspended conductor. By pulling upon the cord or cable R the frame G may be liberated from the lock S and be permitted to move outward under the action of the spring H to bring the guide-frame F into alignment with the suspended conductor and the current-collecting wheel E.

It will be observed that in the construction herein described the flexible guide-frame, as an entirety, will extend below the collector-wheel and also in front and to the rear thereof, so that it forms a gradually-curved guide for the passing trolley, thus overcoming any tendency to displace the latter.

I do not confine myself to any particular construction of the details, as they may be modified in various ways without departing from the principles of my invention.

What I claim as new, and desire to secure by Letters Patent, is—

1. In an electric trolley, the combination of a supporting-arm, a current-collecting device carried at the free end of the arm and adapted to make a running contact with the under surface of a suspended conductor, a flexible guide-frame also carried at the free end of the arm and extending to the front and to the rear of the current-collecting device, and grooved guides carried upon the free ends of the flexible guide-frame whereby they are respectively arranged to the front and to the rear of the current-collecting device.

2. In an electric trolley, the combination of a supporting-arm, a current-collecting device carried at the free end of the arm and adapted to make a running contact with the under surface of a suspended conductor, a flexible guide-frame also carried at the free end of the arm and extending to the front and to the rear of the current-collecting device, grooved guides carried upon the free ends of the flexible guide-frame whereby they are respectively arranged to the front and to the rear of the current-collecting device, and a movable support to which the flexible guide-frame is secured carried upon the free end of the arm whereby the guide-frame may be moved into or out of position relatively to the current-collecting devices.

3. In an electric trolley, the combination of a supporting-arm, a current-collecting device carried at the free end of the arm and adapted to make a running contact with the under surface of a suspended conductor, a flexible guide-frame also carried at the free end of the arm and extending to the front and to the rear of the current-collecting device, grooved guides carried upon the free ends of the flexible guide-frame whereby they are respectively arranged to the front and to the rear of the current-collecting device, a movable support to which the flexible guide-frame is secured carried upon the free end of the arm whereby the guide-frame may be moved into or out of position relatively to the current-collecting device, and a lock adapted to hold the movable support in position when the guide-frame has been moved out of alignment with the current-collecting device.

4. In an electric trolley, the combination of a supporting-arm, a current-collecting device carried at the free end of the arm and adapted to make a running contact with the under surface of a suspended conductor, a flexible guide-frame also carried at the free end of the arm and extending to the front and to the rear of the current-collecting device, grooved guides carried upon the free ends of the flexible guide-frame whereby they are respectively arranged to the front and to the rear of the current-collecting device, a movable support to which the flexible guide-frame is secured carried upon the free end of the arm whereby the guide-frame may be moved into or out of position relatively to the current-collecting device, a lock adapted to hold the movable support in position when the guide-frame has been moved out of alignment with the current-collecting device, and an operating-cord connected with the movable supporting-frame for the purpose of drawing it backward against the action of the spring and into the custody of the lock.

5. In an electric trolley, the combination of an arm carrying at its free end a grooved collector-wheel, with a flexible guide-frame extending in front and to the rear and below the grooved collector-wheel being rigid as to its vertical structure and flexible laterally to follow curves of a suspended conductor, grooved guides carried by the flexible frame at or near its ends for the purpose of working in connection with the suspended conductor to guide the guide-frame and also to cause it to bend laterally where the suspended conductor curves, and a suspended conductor having its under surface free and against which the current-collecting device operates.

6. In an electric trolley, the combination of a supporting-arm, a current-collecting device carried at the free end of the arm and adapted to make a running contact with the under surface of a suspended conductor, a flexible guide-frame also carried at the free end of the arm and extending to the front and to the rear of the current-collecting device, grooved guides carried upon the free ends of the flexible guide-frame whereby they are respectively arranged to the front and to the rear of the current-collecting device, the support for the current-collecting device and the flexible guide-frame being electrically connected together so that the current delivered to the current-collecting device may pass to the guide-frame and thence to a current-collecting device of a second trolley device which may be passing over it.

7. In a trolley, the combination of an arm extending laterally and obliquely from the vehicle and having its free end arranged horizontal or substantially horizontal, with a current-collecting wheel arranged at the free end of the horizontal part of the arm, a flexible guide-frame arranged in front and to the rear and below the current-collecting wheel and provided with guides at or near its ends adapted to operate in connection with the suspended conductor to cause the frame to be curved wherever curves occur in the suspended conductor, and a movable supporting-frame carried by the horizontal part of the arm adapted to support and adjust the flexible guide-frame in proper position relatively to the current-collecting device.

In testimony whereof I have hereunto affixed my signature in the presence of two subscribing witnesses.

GEORGE R. MITCHELL.

Witnesses:
SAMUEL WILLARD,
CYRUS HILLBORN.